United States Patent Office 3,469,476
Patented Sept. 30, 1969

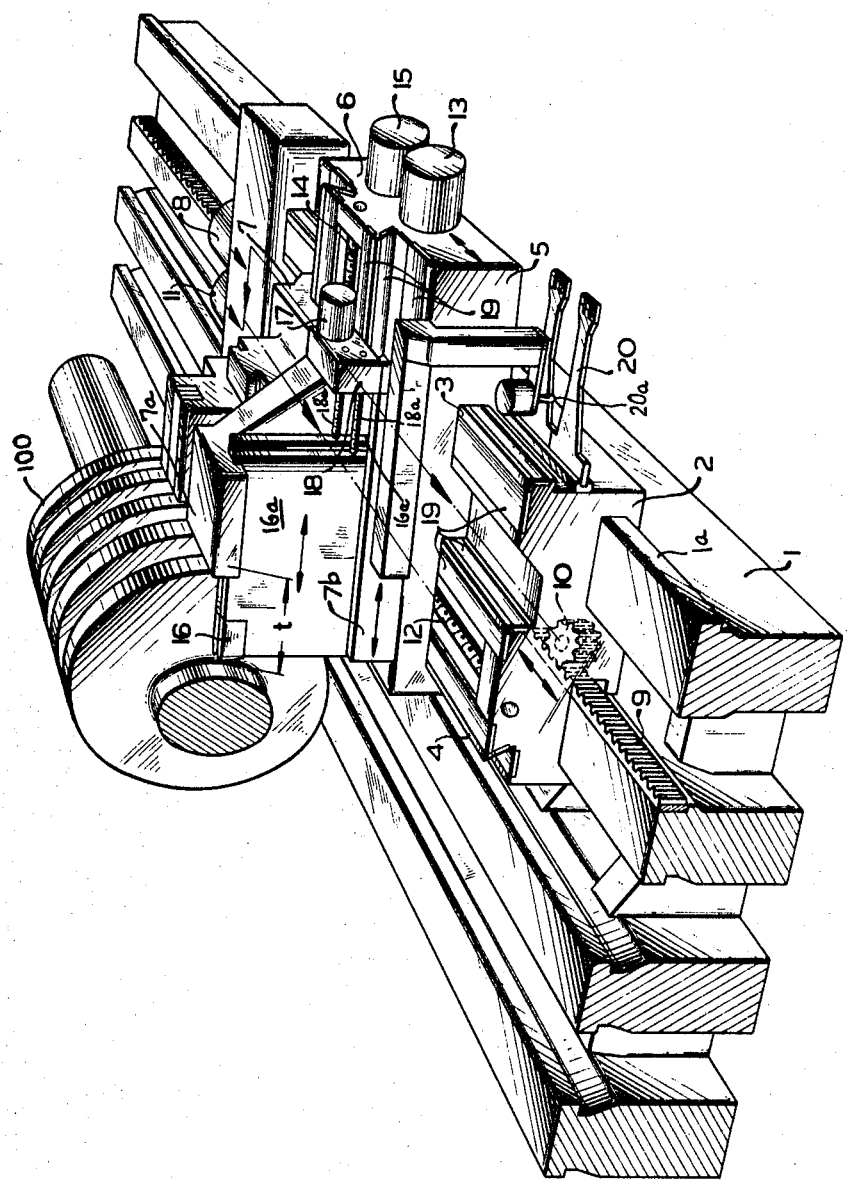

3,469,476
TURNING LATHE
Wilhelm Engelbrecht, Dortmund-Kirchhorde, Germany, assignor to Hoesch Maschinenfabrik Deutschland AG, Dortmund, Germany
Filed Apr. 13, 1967, Ser. No. 630,603
Claims priority, application Germany, Nov. 26, 1966, H 61,112
Int. Cl. B23b 3/28
U.S. Cl. 82—14                               8 Claims

ABSTRACT OF THE DISCLOSURE

A programmable heavy-duty rough-turning or finish-turning lathe wherein the main slide is arranged to reciprocate along the bed but is normally stationary. The main slide supports a first carriage which, in turn, supports a second carriage for one or more tool holders. The main slide and the first carriage are reciprocable in parallelism with the axis of the workpiece, and the second carriage is reciprocable at right angles to the axis of the workpiece. The drives for the two carriages comprise motor-driven feed screws and the ways for the two carriages are armored with polished plates of hardened metal.

Cross-reference to related application

The manner in which the tool holders can be mounted on the second carriage of the turning lathe is disclosed in my copending application Serial No. 624,285, filed March 20, 1967, and entitled "Tool Mount for Turning Lathes."

Background of the invention

The present invention relates to turning lathes in general, and more particularly to improvements in programmable heavy-duty rough-turning or finish-turning lathes.

In conventional heavy-duty turning lathes wherein a workpiece rotates about a fixed axis, movements of the tool in the axial direction of the workpiece are effected by displacement of the main slide with reference to the lathe bed. Transverse feed movements (at right angles to the axis of the workpiece) are effected by a carriage which is reciprocable along the main slide and supports the tool holder. The main slide is reciprocable by a drive which includes a motor and a rack and pinion assembly which receives motion from the motor. The drive for the carriage includes a motor which operates a rack and pinion assembly or a feed screw. A serious drawback of such turning lathes is that the weight of the main slide is a multiple of the weight of the carriage, i.e., that a very large mass must be set in motion whenever it becomes necessary to displace the tool in parallelism with the axis of the workpiece in order to locate the tool in requisite position prior to movement into material-removing engagement with the workpiece. Friction between the bed and the main slide is very high, i.e., much higher than between the main slide and the carriage. Thus, and if the turning lathe is programmed and includes D-C motors or hydraulic motors which serve to reciprocate the main slide and the carriage, the motor which forms part of the drive for the main slide must be much stronger than the motor which forms part of the drive for the carriage. Moreover, the wear on the main slide and the bed is very high so that the ways along which the slide travels must be refinished or replaced at frequent intervals.

It is also known to reciprocate the main slide by means of a drive which includes a very long feed screw. The length of strokes of the main slide in such lathes is necessarily very short because a long feed screw is incapable of transmitting motion with requisite accuracy, i.e., with the accuracy expected for example from a finish-turning lathe.

Attempts to avoid the aforedescribed drawbacks of conventional turning lathes wherein the main slide must be displaced with reference to the bed include the provision of a tool holder which is reciprocable along the carriage in parallelism with the axis of the workpiece. Such solutions are also unsatisfactory, mainly because the tool holder must move well beyond its support when the tool is required to make a deep cut. Therefore, the transfer of cutting forces from the tool to the bed of the turning lathe is very unsatisfactory.

Accordingly, it is an important object of the present invention to provide a novel and improved heavy-duty rough-turning or finish-turning lathe which is constructed and assembled in such a way that the weight of parts which must be displaced to effect lengthwise or transverse movements of the tool when the lathe is in actual use is relatively small and that the transfer of cutting forces from the tool to the bed is much more satisfactory than in heretofore known turning lathes.

Another object of the invention is to provide a novel system of slides and carriages for the tool or tools in a heavy-duty turning lathe.

A further object of the invention is to provide a novel system of drive means for the slide and carriages of a turning lathe and to construct and assemble the drive means in such a way that at least one of their components can transmit motion to a plurality of relatively movable parts.

An additional object of the invention is to provide a heavy-duty turning lathe wherein all movements of the tools, preparatory to and during material-removing engagement with a revolving workpiece, can be carried out with much greater accuracy than in heretofore known turning lathes.

A concomitant object of the invention is to provide a turning lathe wherein the wear on moving parts is low and wherein substantial reduction in wear can be achieved at reasonable cost.

Summary of the invention

One feature of the present invention resides in the provision of a programmable heavy-duty turning lathe or an analogous machine tool wherein the workpiece rotates about a predetermined axis, preferably about a horizontal axis. The lathe comprises a bed or main support, a main slide which is reciprocable along the bed in parallelism with the axis of rotation of the workpiece and can be fixed in selected positions of adjustment, a first carriage which is reciprocable along the main slide, a second carriage which is reciprocable along the first carriage, one of these carriages (preferably the first carriage) being movable in parallelism with the axis of rotation and the other carriage (preferably the second carriage) being reciprocable at right angles to the axis of rotation of the workpiece, tool holder means provided on the second carriage and being preferably reciprocable with reference to the second carriage in directions at right angles to the axis of rotation of the workpiece, first drive means provided on the main slide for reciprocating the first carriage with reference to the main slide, and second drive means provided on the first carriage for reciprocating the second carriage with reference to the first carriage. Each of these drive means preferably comprises a motor-driven feed screw (preferably a so-called ball roll spindle) which meshes with a portion of the respective carriage.

The novel features which are considered as characteristic of the invention are set forth in particular in the appended claims. The improved turning lathe itself, however, both as to its construction and its mode of operation, together with additional features and advantages thereof, will be best understood upon perusal of the following detailed description of certain specific embodiments with reference to the accompanying drawing.

Brief description of the drawing

The single figure is a fragmentary perspective view of a heavy-duty turning lathe which embodies the present invention.

Description of the preferred embodiments

The drawing shows a heavy-duty rough-turning or finish-turning lathe which comprises a main support or bed 1. The workpiece 100 is supported for rotation about a horizontal axis and is driven by a suitable motor in a manner well known from the art of conventional turning lathes. The bed 1 is provided with horizontal ways 1a which extend in parallelism with the axis of the workpiece 100 and support and guide a main slide 2 which can be fixed in selected positions of adjustment. The drive for the main slide 2 comprises a motor 8 which is mounted on the main slide and can rotate a pinion 10 meshing with a rack 9 on the ways 1a of the bed 1. The motor 8 is of the variable-speed type so that it can effect rapid traverse and feed movements of the main slide 2.

The main slide 2 is provided with armored ways 3, 4 which extend in parallelism with the axis of the workpiece 100 and guide a first or lower carriage 5. This carriage 5 is provided with armored horizontal ways 6 for a second or upper carriage 7. The ways 6 extend at right angles to the ways 3, 4, i.e., at right angles to the axis of the workpiece 100.

The drive means for the first carriage 5 is mounted on the main slide 2 and includes the aforementioned motor 8 which can effect rapid traverse movements of the carriage 5. Feed movements of the carriage 5 are effected by a second motor 11. The drive means also includes a feed screw 12 which is rotatable in the main slide 2 and meshes with a spindle nut forming part of the carriage 5. The arrows indicate the direction of power flow from the motors 8, 11 to the pinion 10 and feed screw 12. The motor 11 may be a hydraulic motor or an electric D-C motor.

The drive means for the second carriage 7 includes two motors 13, 15 and a feed screw 14 which meshes with a portion of the carriage 7. The motor 13 is a hydraulic motor or a D-C motor, and its operation is programmed. The motor 15 effects rapid traverse movements of the carriage 7 and the motor 13 effects feed movements. The motor 8 is also programmable in that its operation starts and ends in response to signals received from a suitable programming device. Such programming device can regulate the operation of the motor 8 to displace the main slide 2 and/or the first carriage 5. The means for locking the main slide 2 in selected positions of adjustment is not shown in the drawing.

The second carriage 7 is rigid with a support 7a for one or more plate-like tool holers 16a each of which carries a turning tool 16. The support 7a has an extension 7b which is provided with horizontal ways defining a channel which receives the lower edge portions of the tool holders 16a and extends at right angles to the axis of the workpiece 100. The drive means for displacing the tool holders 16a comprises a motor 17 which drives a transmission 18 for two feed screws 18a, one for each tool holder 16a. The motor 17 is programmed and determines the depth of cut (t) formed by the turning tools 16 in the periphery of the workpiece 100. The advantages of the support 7a and its extension 7b are disclosed in my aforementioned copending application Serial No. 124,285.

The armors for the ways 3, 4 and 6 are constituted by polished plates 19 of hardened steel or other suitable metallic material.

The drawing further shows a programming device in the form of a template 20 affixed to the main slide 2 and tracked by a follower 20a reciprocably mounted on the carriage 5 in such a way that it shares all movements of the carriage 5 with reference to the main slide 2 and also each movement of the carriage 7 with reference to the carriage 5.

Since the feed movements for displacing the tools 16 in parallelism with and at right angles to the axis of rotation of the workpiece 100 are carried out mainly by the carriages 5 and 7, the longest ways 1a for the main slide 2 need not be armored with plates or the like. This results in considerable reduction of the cost of the machine tool.

The template 20 is attached to the main slide 2 at a point without the range of movement of the first carriage 5 so that it does not interfere with cables, brackets for gauges and other auxiliary equipment installed at the underside of the carriage 5. A template can be utilized to program the operation of the turning lathe irrespective of the depth of cut. It is further clear that the operation of drive means for the main slide 2, carriages 5, 7 and tool holders 16a can be regulated by other programming devices, for example, by a computer which receives information from tape, perforated cards or other sources.

The accuracy of adjustments of the carriages 5 and 7 will be improved if the feed screws 12 and 14 are constituted by so-called ball screws. The accuracy of the lathe is further enhanced by the provision of aforementioned plates 19 which constitute an armor for the ways 3, 4 and 6.

What is claimed as new and desired to be protected by Letters Patent is:

1. A programmable turning lathe wherein the workpiece rotates about a predetermined axis, said lathe comprising a support; a slide reciprocable along said support in parallelism with said axis; a first carriage reciprocable along said slide in parallelism with said axis; a second carriage reciprocable along said first carriage at right angles to said axis; tool holder means provided on said second carriage; first drive means provided on said slide for moving said first carriage with reference to said slide; and second drive means provided on said first carriage for moving said second carriage with reference to said first carriage, each of said drive means comprising a few screw and motor means for rotating said feed screw.

2. A turning lathe as defined in claim 1, wherein said feed screws are constituted by ball screws.

3. A turning lathe as defined in claim 1, wherein said slide comprises armored ways for said first carriage and said first carriage comprises armored ways for said second carriage.

4. A turning lathe as defined in claim 3, wherein said ways are armored by polished plates of hardened metallic material.

5. A turning lathe as defined in claim 1, wherein the workpiece is rotatable about a horizontal axis and further comprising programming means for operating said drive means to regulate the movements of said carriages.

6. A turning lathe as defined in claim 5, wherein said programming means comprises a template affixed to said slide and follower means provided on at least one of said carriages to track said template.

7. A turning lathe as defined in claim 1, wherein said tool holder means is reciprocable along said second carriage at right angles to said axis, and further comprising third drive means for moving said tool holder means with reference to said second carriage.

8. A turning lathe as defined in claim 7, wherein said second carriage supports said third drive means, said third drive means comprising a motor and at least one feed screw driven by said motor and meshing with a portion of said tool holder means.

References Cited

UNITED STATES PATENTS

| | | | |
|---|---|---|---|
| 80,292 | 7/1868 | Lippatt | 82—14 |
| 1,289,674 | 12/1918 | Coradi | 82—14 |
| 2,086,845 | 7/1937 | Bullard | 82—21 |
| 2,118,489 | 5/1938 | Carter | 82—21 |
| 2,167,609 | 7/1939 | Dolle | 82—32 |
| 2,333,985 | 11/1943 | Clark | 82—14 |
| 2,934,974 | 5/1960 | Schoepe | 82—21 |
| 3,083,592 | 4/1963 | Carlstedt | 82—21 |
| 3,186,267 | 6/1965 | Pabst et al. | 82—32 |

GERALD A. DOST, Primary Examiner

U.S. Cl. X.R.

82—21